(12) United States Patent
Mizoguchi

(10) Patent No.: US 8,797,625 B2
(45) Date of Patent: Aug. 5, 2014

(54) ACTUATOR, METHOD FOR MANUFACTURING ACTUATOR, AND OPTICAL SCANNER

(75) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 273 days.

(21) Appl. No.: 13/358,768

(22) Filed: Jan. 26, 2012

(65) Prior Publication Data

US 2012/0236383 A1   Sep. 20, 2012

(30) Foreign Application Priority Data

Mar. 16, 2011 (JP) ................................. 2011-058556

(51) Int. Cl.
*G02B 26/08* (2006.01)
(52) U.S. Cl.
USPC ........................................................ 359/224.1
(58) Field of Classification Search
CPC ........... G02B 26/0816; G02B 26/0833; G02B 26/0841; G02B 26/085
USPC .......................................... 359/223.1–226.1
See application file for complete search history.

(56) References Cited

U.S. PATENT DOCUMENTS

| 5,606,447 | A | 2/1997 | Asada et al. |
| 7,268,929 | B2 | 9/2007 | Asai |
| 7,619,802 | B2 * | 11/2009 | Brown et al. ............... 359/224.1 |
| 2005/0189845 | A1 * | 9/2005 | Kihara .......................... 310/309 |

FOREIGN PATENT DOCUMENTS

| JP | 07-175005 | 7/1995 |
| JP | 2005-107069 | 4/2005 |
| JP | 2010-165613 | 7/2010 |
| JP | 2010-171164 | 8/2010 |
| JP | 2011-048074 | 3/2011 |

* cited by examiner

*Primary Examiner* — Euncha Cherry
(74) *Attorney, Agent, or Firm* — Harness, Dickey & Pierce, P.L.C.

(57) ABSTRACT

An actuator includes a base made of silicon and including a movable portion capable of oscillating around an oscillation axis, at least one connection portion extending from the movable portion, and a support portion that supports the connection portion, an insulating layer provided on a surface of the base, and a conductive portion having conductivity and provided on the insulating layer. In a plan view of the base viewed in a thickness direction of the base, the insulating layer is provided on portions other than an edge of the connection portion, an edge that connects an edge of the movable portion to the edge of the connection portion, and an edge that connects an edge of the support portion to the edge of the connection portion.

14 Claims, 11 Drawing Sheets

ACTUATOR, METHOD FOR MANUFACTURING ACTUATOR, AND OPTICAL SCANNER

BACKGROUND

1. Technical Field

The present invention relates to an actuator, a method for manufacturing the actuator, and an optical scanner.

2. Related Art

There is a known actuator using a structure including a torsional oscillator formed by processing a silicon substrate with the aid of MEMS (micro-electro-mechanical systems) technology (see JP-A-7-175005, for example). The actuator is used as an optical scanner that deflects light in a printer, a display, or other apparatus.

For example, the actuator described in JP-A-7-175005 includes a flat movable plate and a pair of torsional bars that pivotally support the movable plate. The actuator further includes a flat coil provided over the movable plate and fixed permanent magnets, and the movable plate oscillates based on magnetic interaction between the flat coil and the permanent magnets.

In the actuator, the flat coil is disposed over the movable plate with an insulating layer therebetween so that the flat coil and the movable plate are electrically insulated from each other.

The structure including the movable plate and the pair of torsional bars is formed by etching a silicon substrate.

When the structure is formed in a dry etching process, irregularities called scallops are disadvantageously formed on the side surfaces of the movable plate and the torsional bars. On the other hand, when the structure is formed in a wet etching process, corners resulting from the silicon crystal plane are disadvantageously formed along the interface between the movable plate and each of the torsional bars.

When such irregularities and corners are formed on the torsional bars, stress concentration tends to occur when the movable plate oscillates, resulting in decrease in lifetime of the actuator. It is therefore necessary to planarize the irregular side surfaces and round the corners. To this end, it is effective to perform a thermal treatment using silicon surface diffusion motion. In the actuator described in JP-A-7-175005, however, an insulating layer formed of a silicon oxide film is also formed in the vicinity of the side surfaces of the movable plate and the torsional bars. The insulating layer disadvantageously prevents the irregular side surfaces from being fully planarized and the corners from being fully rounded.

SUMMARY

An advantage of some aspects of the invention is to provide an actuator, a method for manufacturing the actuator, an optical scanner, and an image formation apparatus that allow the lifetime of the actuator, the optical scanner, and the image formation apparatus to be prolonged relatively readily in a configuration in which a conductor pattern is provided over a base having an oscillatory system with an insulating layer interposed between the conductive pattern and the base.

An actuator according to an aspect of the invention includes a base made of silicon and including a movable portion capable of oscillating around an oscillation axis, at least one connection portion extending from the movable portion, and a support portion that supports the connection portion, an insulating layer provided on a surface of the base, and a conductive portion having conductivity and provided on the insulating layer, wherein in a plan view of the base viewed in a thickness direction of the base, the insulating layer is provided on portions other than an edge of the connection portion, an edge that connects an edge of the movable portion to the edge of the connection portion, and an edge that connects an edge of the support portion to the edge of the connection portion.

According to the actuator described above, the side surface of the portion where the movable portion is connected to the connection portion, the side surface of the portion where the support portion is connected to the connection portion, and the side surface of the connection portion can be entirely planarized with the insulting layer formed on the base. Further, the edge where the edge of the movable portion is connected to the edge of the connection portion, the edge where the edge of the support portion is connected to the edge of the connection portion, and the edge of the connection portion can be rounded at the same time in the planarization process.

Stress concentration that occurs at the connection portion and portions around the connection portion when the movable portion oscillates will therefore not occur or the amount of stress concentration can be reduced. As a result, the lifetime of the actuator can be prolonged.

In the actuator according to the aspect of the invention, each of the edge of the connection portion, the edge that connects the edge of the movable portion to the edge of the connection portion, and the edge that connects the edge of the support portion to the edge of the connection portion preferably has an exposed surface made of the silicon.

In this configuration, the side surface of the portion where the movable portion is connected to the connection portion, the side surface of the portion where the support portion is connected to the connection portion, and the side surface of the connection portion can be entirely planarized.

In the actuator according to the aspect of the invention, each of the edge of the connection portion, the edge that connects the edge of the movable portion to the edge of the connection portion, and the edge that connects the edge of the support portion to the edge of the connection portion is preferably planarized.

Stress concentration that occurs at the connection portion and portions around the connection portion when the movable portion oscillates will therefore not occur or the amount of stress concentration can be reduced.

In the actuator according to the aspect of the invention, the movable portion preferably has a light reflecting portion provided on the movable portion and having light reflectivity.

The light reflecting portion allows the actuator according to the aspect of the invention to be used as an optical scanner, an optical switch, an optical attenuator, and other optical devices.

In the actuator according to the aspect of the invention, the insulating layer is preferably provided on a surface of the base that faces away from the surface on which the light reflecting portion is provided.

In this configuration, the conductive portion can be formed by making effective use of the surface of the base that faces away from the surface on which the light reflecting portion is provided.

In the actuator according to the aspect of the invention, in the plan view of the base viewed in the thickness direction of the base, the insulating layer is preferably provided on the entire surface of the base other than the edge of the connection portion, the edge that connects the edge of the movable portion to the edge of the connection portion, and the edge that connects the edge of the support portion to the edge of the connection portion.

The thus formed insulating layer allows components of the conductive portion to be reliably insulated from each other.

In the actuator according to the aspect of the invention, the insulating layer preferably has the same shape as the shape of the conductive portion.

The thus formed insulating layer allows the insulating layer to be patterned in an etching process using the conductive portion a mask.

In the actuator according to the aspect of the invention, the insulating layer preferably prevents light reflection.

The thus formed insulating layer prevents stray light from being produced.

In the actuator according to the aspect of the invention, the insulating layer is preferably formed of a silicon oxide film or a silicon nitride film.

A silicon oxide film is insulative and can be relatively readily formed by thermally oxidizing silicon. Further, when hydrogen annealing is performed as the planarization, minute irregularities can be formed on the surface of the insulating layer. The irregular insulating layer prevents or suppresses light reflection.

In the actuator according to the aspect of the invention, the conductive portion is preferably made of Ta.

Ta has conductivity and a high melting point. These properties make Ta suitable for a conductor and resistant to heat generated in hydrogen annealing or any other heat treatment used in the planarization.

A method for manufacturing an actuator according to another aspect of the invention includes forming an insulating layer on a surface of a silicon substrate, forming a conductive portion on the insulating layer, and forming a base including a movable portion capable of oscillating around an oscillation axis, at least one connection portion extending from the movable portion, and a support portion that supports the connection portion by etching and then planarizing the silicon substrate, wherein in the formation of the insulating layer, in a plan view of the base viewed in a thickness direction of the base, the insulating layer is formed on portions other than an edge of the connection portion, an edge that connects an edge of the movable portion to the edge of the connection portion, and an edge that connects an edge of the support portion to the edge of the connection portion.

According to the method for manufacturing an actuator described above, the side surface of the portion where the movable portion is connected to the connection portion, the side surface of the portion where the support portion is connected to the connection portion, and the side surface of the connection portion can be entirely planarized with the insulting layer formed on the base. Further, the edge where the edge of the movable portion is connected to the edge of the connection portion, the edge where the edge of the support portion is connected to the edge of the connection portion, and the edge of the connection portion can be rounded at the same time in the planarization process.

Stress concentration that occurs at the connection portion and portions around the connection portion when the movable portion oscillates will therefore not occur or the amount of stress concentration can be reduced. As a result, the lifetime of the resultant actuator can be prolonged.

In the method for manufacturing an actuator according to the aspect of the invention, the planarization is preferably hydrogen annealing or the hydrogen annealing followed by annealing in an Ar atmosphere.

The thus performed planarization allows the side surface of the portion where the movable portion is connected to the connection portion, the side surface of the portion where the support portion is connected to the connection portion, and the side surface of the connection portion to be planarized. Further, the edge where the edge of the movable portion is connected to the edge of the connection portion, the edge where the edge of the support portion is connected to the edge of the connection portion, and the edge of the connection portion can be rounded.

An optical scanner according to still another aspect of the invention includes a base made of silicon and including a movable portion capable of oscillating around an oscillation axis and including a light reflecting portion having light reflectivity, at least one connection portion extending from the movable portion, and a support portion that supports the connection portion, an insulating layer provided on a surface of the base, and a conductive portion having conductivity and provided on the insulating layer, wherein in a plan view of the base viewed in a thickness direction of the base, the insulating layer is provided on portions other than an edge of the connection portion, an edge that connects an edge of the movable portion to the edge of the connection portion, and an edge that connects an edge of the support portion to the edge of the connection portion.

According to the optical scanner described above, the side surface of the portion where the movable portion is connected to the connection portion, the side surface of the portion where the support portion is connected to the connection portion, and the side surface of the connection portion can be entirely planarized with the insulting layer formed on the base. Further, the edge where the edge of the movable portion is connected to the edge of the connection portion, the edge where the edge of the support portion is connected to the edge of the connection portion, and the edge of the connection portion can be rounded at the same time in the planarization process.

Stress concentration that occurs at the connection portion and portions around the connection portion when the movable portion oscillates will therefore not occur or the amount of stress concentration can be reduced. As a result, the lifetime of the optical scanner can be prolonged.

An image formation apparatus according to yet another aspect of the invention includes a light source that emits light, and an optical scanner that deflects the light from the light source, wherein the optical scanner includes a plate-shaped base made of silicon and including a light reflecting portion having light reflectivity, a movable portion capable of oscillating around a predetermined oscillation axis and including the light reflecting portion, at least one connection portion connected to the movable portion, and a support portion that supports the connection portion, an insulating layer provided on a surface of the base, and a conductive portion having conductivity and provided on the insulating layer, wherein in a plan view of the base viewed in a thickness direction of the base, the insulating layer is provided on portions other than an edge of the connection portion, an edge that connects an edge of the movable portion to the edge of the connection portion, and an edge that connects an edge of the support portion to the edge of the connection portion.

According to the image formation apparatus described above, stress concentration that occurs at the connection portion and portions around the connection portion when the movable portion oscillates will not occur or the amount of stress concentration can be reduced. As a result, the lifetime of the optical scanner and hence the lifetime of the image formation apparatus can be prolonged.

BRIEF DESCRIPTION OF THE DRAWINGS

The invention will be described with reference to the accompanying drawings, wherein like numbers reference like elements.

DESCRIPTION OF EXEMPLARY EMBODIMENTS

An actuator, a method for manufacturing the actuator, an optical scanner, and an image formation apparatus according to preferred embodiments of the invention will be described below with reference to the accompanying drawings. The following description will be made with reference to a case where the actuator according to the preferred embodiment of the invention is used as an optical scanner.

First Embodiment

An optical scanner according to a first embodiment of the invention will first be described.

Figure 1:
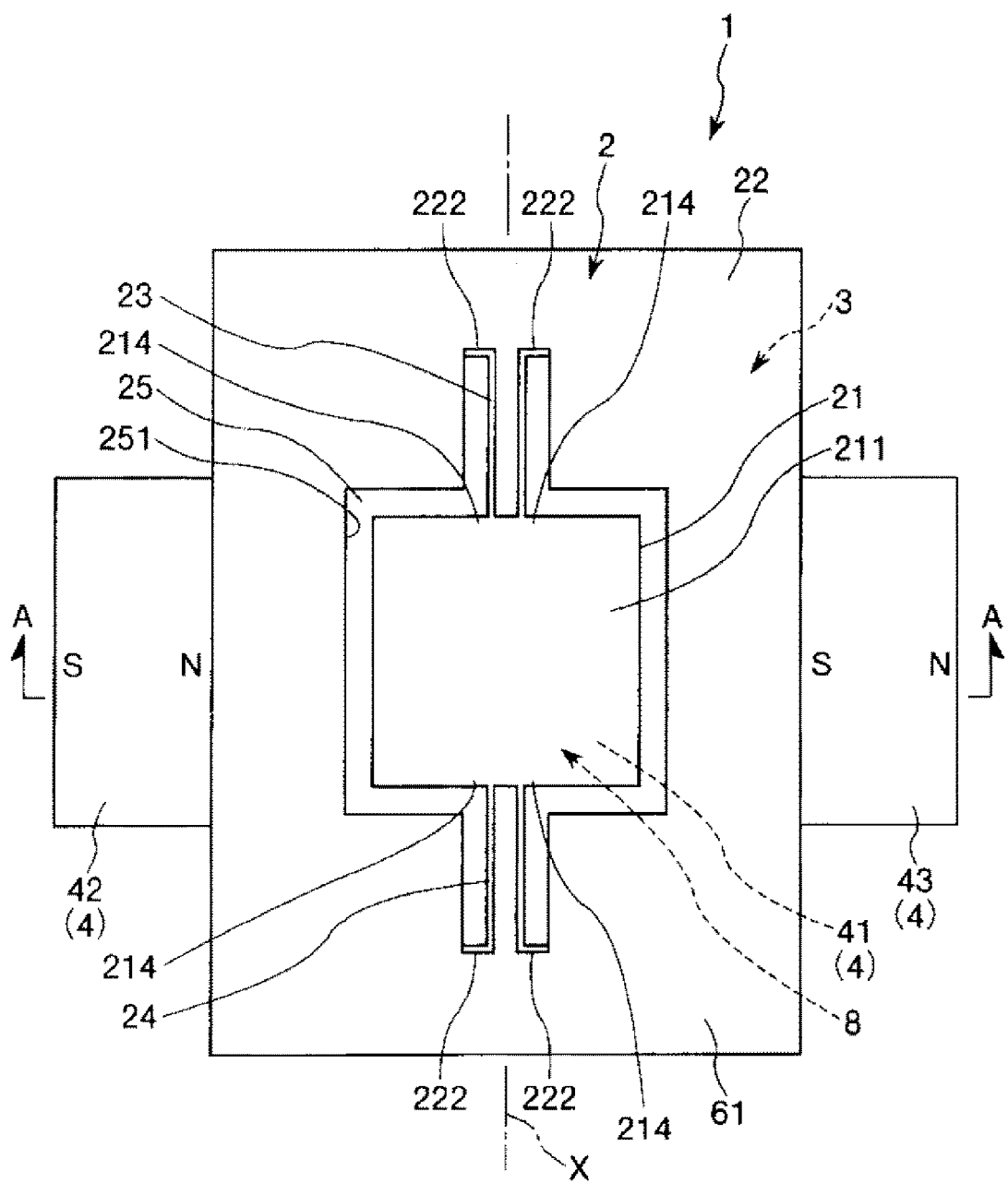
FIG. 1 is a plan view (top view) showing an optical scanner (actuator) according to a first embodiment of the invention.
Figure 2:
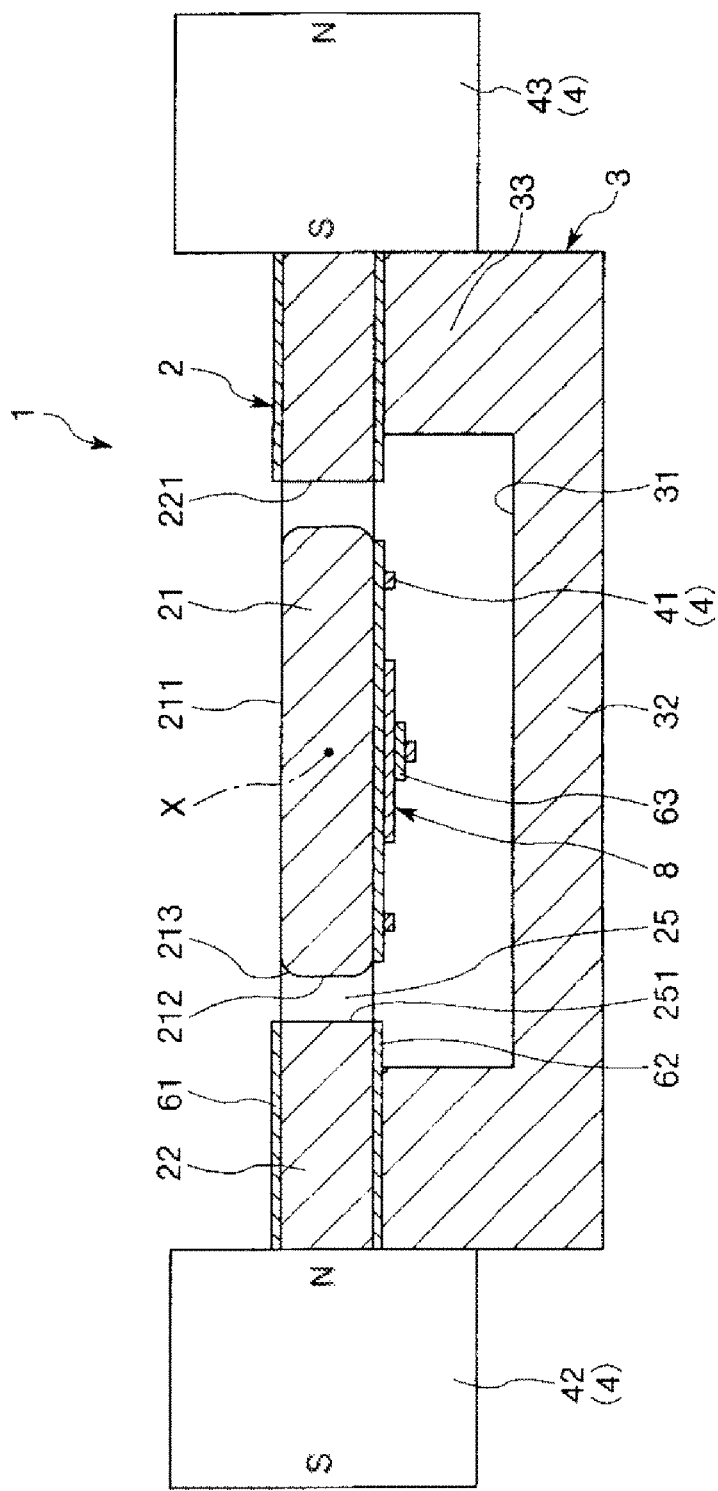
FIG. 2 is a cross-sectional view taken along the line A-A shown in FIG. 1.
Figure 3:
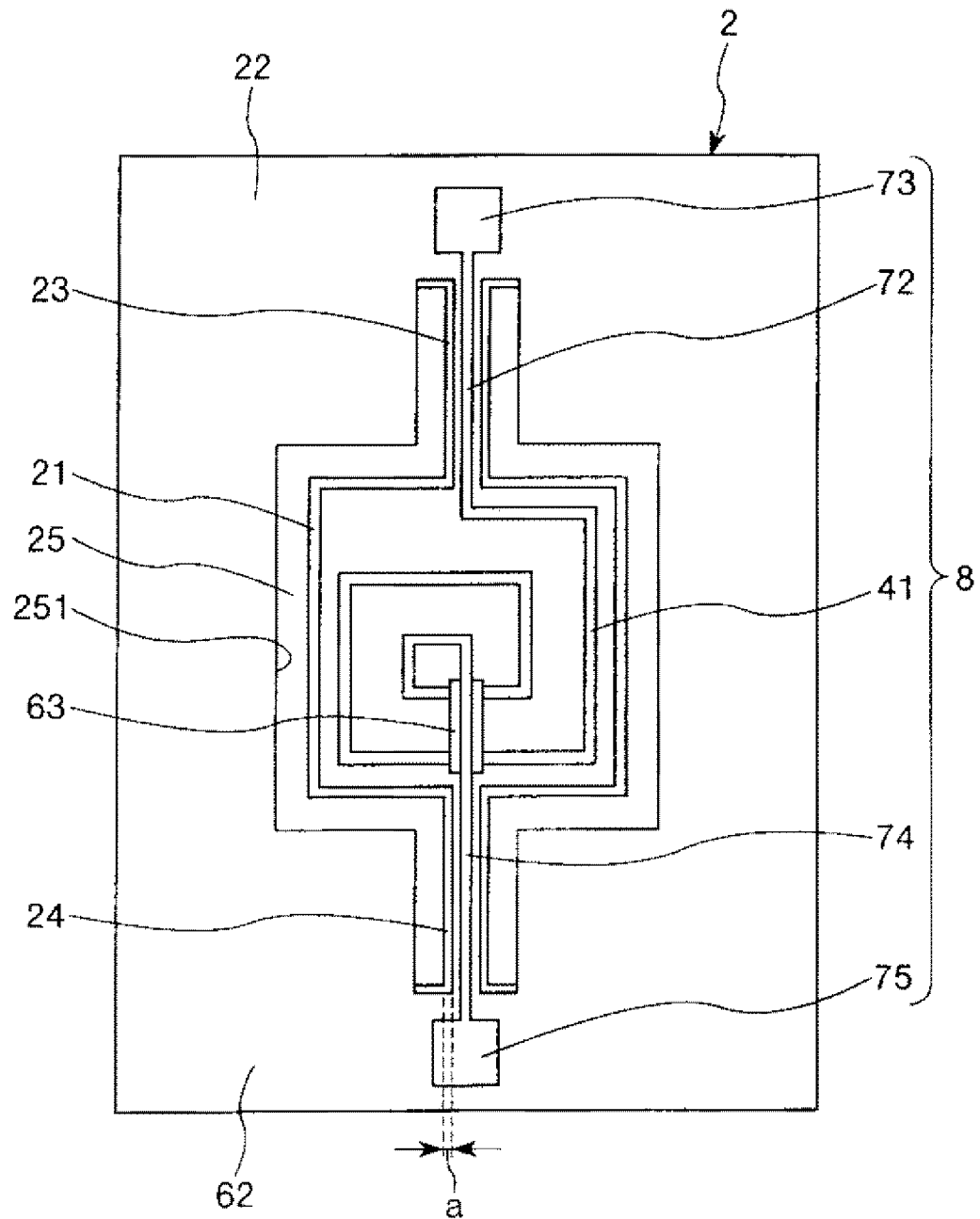
FIG. 3 is a plan view (bottom view) showing a base (a structure including a movable plate, a support portion, and a pair of elastic portions) provided in the optical scanner shown in FIG. 1.
Figure 4:
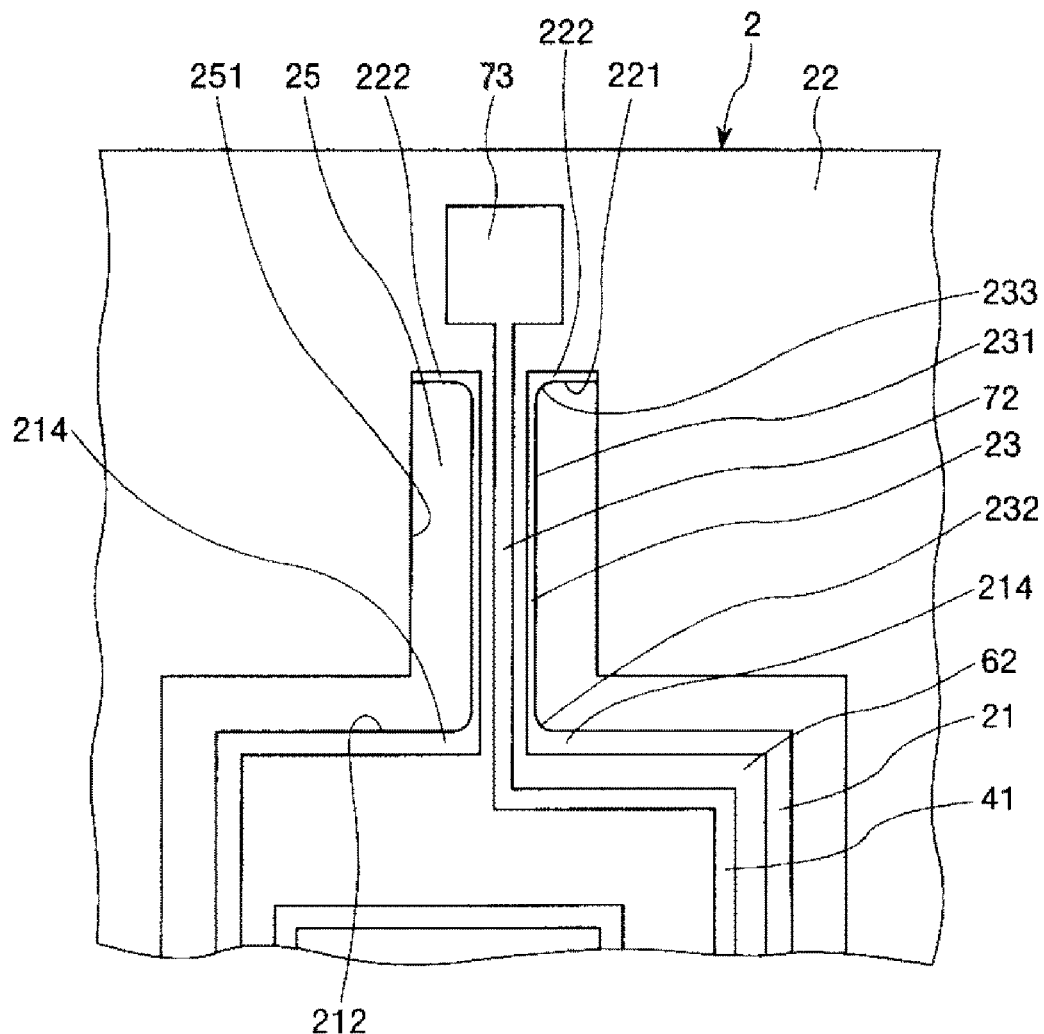
FIG. 4 is a partial enlarged view of the base shown in FIG. 3.

FIG. 1 is a plan view (top view) showing the optical scanner (actuator) according to the first embodiment of the invention. FIG. 2 is a cross-sectional view taken along the line A-A shown in FIG. 1. FIG. 3 is a plan view (bottom view) showing a base (a structure including a movable plate, a support portion, and a pair of elastic portions) provided in the optical scanner shown in FIG. 1. FIG. 4 is a partial enlarged view of the base shown in FIG. 3. FIGS. 5A to 5D and 6A to 6D are cross-sectional views describing a method for manufacturing the optical scanner shown in FIG. 1. In the following sections, the upper side and the lower side in FIGS. 2, 5A to 5D, and 6A to 6D are referred to as "up" and "down," respectively, for ease of description.

An optical scanner 1 includes a plate-shaped base 2 having an oscillatory system, a support 3 that supports the base 2, and a driver 4 that oscillates the oscillatory system of the base 2, as shown in FIG. 1.

The base 2 includes a movable plate (movable portion) 21 having a light reflecting portion 211 provided thereon, a pair of connection portions 23 and 24 connected to the movable plate 1, and a support portion 22 that supports the pair of connection portions 23 and 24. In other words, the support portion 22 supports the movable plate 21 via the connection portions 23 and 24, and the pair of connection portions 23 and 24 connect the movable plate 21 and the support portion 22 to each other.

In the thus configured optical scanner 1, the driver 4 produces a drive force that oscillates the movable plate 21 around a predetermined axis along the connection portions 23 and 24 while torsionally deforming the connection portions 23 and 24. Light reflected off the light reflecting portion 211 is thus deflected along a predetermined direction.

The components that form the optical scanner 1 will be sequentially described below in detail.

Base

The base 2 includes the movable plate 21, on which the light reflecting portion 211 is provided, the support portion 22, which supports the movable plate 21, and the pair of connection portions 23 and 24, which connect the movable plate 21 and the support portion 22 to each other, as described above.

The base 2 is made of silicon, and the movable plate 21, the support portion 22, and the connection portions 23 and 24 are formed integrally with each other. The base 2 is formed by etching a silicon substrate, as will be described later, and a polygonal through hole 25 passing therethrough in the thickness direction is formed in the etching process.

Since silicon is as light and rigid as SUS, the base 2 made of silicon has excellent oscillation characteristics. Further, since silicon can be etched with high dimensional precision, as will be described later, the base 2 formed of a silicon substrate can be formed into a desired shape (having desired oscillation characteristics). The silicon substrate is typically formed of a single crystal silicon substrate.

The base 2 will be further described below in detail.

The support portion 22 has a frame-like shape, as shown in FIG. 1. More specifically, the support portion 22 has an annular shape having an internal circumference along an outer circumference of the movable plate 21 and the side surfaces of each of the connection portions 23 and 24. That is, the through hole 25 described above is so formed that the width thereof is minimized and uniform but large enough to permit the oscillating motion of the movable plate 21 and the torsional deformation of the connection portions 23 and 24. The thus formed through hole 25 prevents unwanted light from passing therethrough from the upper side to the lower side of the base 2, or the amount of unwanted light is reduced. The thus formed support portion 22 supports the movable plate 21 via the pair of connection portions 23 and 24. The shape of the support portion 22 is not limited to a specific one and may be any shape that can support the movable plate 21 via the pair of connection portions 23 and 24. For example, the support portion 22 may be divided along a line corresponding to the connection portions 23 and 24.

The movable plate 21 is disposed inside the support portion 22.

The movable plate 21 has a plate-like shape. In the present embodiment, the movable plate 21 has a rectangular shape (square shape in the present embodiment) in the plan view. The shape of the movable plate 21 in the plan view is not limited to a rectangle and may, for example, be a pentagon, a hexagon, or any other polygonal shape, a circle, or an ellipse.

The light reflecting portion 211 having light reflectivity is provided on the upper surface of the movable plate 21.

Each of the connection portions 23 and 24 has an elongated shape and is elastically deformable. Further, the connection portion 23 and the connection portion 24 are disposed on opposite sides of the movable plate 21. The connection portions 23 and 24 connect the movable plate 21 and the support portion 22 to each other in such a way that the movable plate 21 can oscillate relative to the support portion 22. The pair of connection portions 23 and 24 are coaxially disposed along an oscillation axis X, and the movable plate 21 oscillates relative to the support portion 22 around the oscillation axis X.

Each of the connection portions 23 and 24 has a rectangular cross-sectional shape. In the present embodiment, each of the connection portions 23 and 24 has upper and lower surfaces parallel to each other along the surfaces of the base 2 and a pair of side surfaces parallel to each other and perpendicular to the upper and lower surfaces. The cross-sectional shape of each of the connection portions 23 and 24 is not limited to a rectangle and may alternatively be, for example, a trapezoid or a parallelogram. Each of the connection portions 23 and 24 may alternatively be formed of a plurality of beams parallel to each other.

In the thus configured base 2, edges of the connection portions 23 and 24 and edges of the movable plate 21 and the support portion 22 in the vicinity of the connection portions 23 and 24 (edges that connect the edges of the movable plate 21 and the support portion 22 to the edges of the connection portions 23 and 24) are planarized. In the present embodiment, a wall surface 251 of the through hole 25 in the base 2 is entirely planarized.

Edges used herein refer to outer portions of a member in portions and portions around the outer portions. In particular, in the present embodiment, the edges of the movable plate 21, the support portion 22, and the connection portions 23 and 24 correspond to the portions of the movable plate 21, the support portion 22, and the connection portions 23 and 24 that face the through hole 25.

More specifically, the side surface 212 of the movable plate 21 is planarized, as shown in FIG. 2. Further, a corner 213 formed at each edge of the upper and lower surfaces of the movable plate 21 is rounded in the planarization process.

A pair of side surfaces 231 of the connection portion 23 and the side surface 221 of the support portion 22 are also planarized, as shown in FIG. 4.

Further, a pair of corners 232 formed in the vicinity of the boundaries between the side surface 212 of the movable plate 21 and the side surfaces 231 of the connection portion 23 and corners 233 formed in the vicinity of the boundaries between the side surfaces 231 of the connection portion 23 and the side surface 221 of the support portion 22 are rounded in the planarization process.

Although not shown, a pair of side surfaces of the connection portion 24 are planarized as well as the side surfaces 231 of the connection portion 23. A pair of corners formed in the vicinity of the boundaries between the side surface 212 of the movable plate 21 and the side surfaces of the connection portion 24 and corners formed in the vicinity of the boundaries between the side surfaces of the connection portion 24 and the side surface 221 of the support portion 22 are also rounded in the planarization process, as in the case of the corners 232 and 233.

The planarization prevents or reduces stress concentration that occurs at the connection portions 23 and 24 when the torsional deformation of the pair of connection portions 23 and 24 oscillates the movable plate 21. As a result, the lifetime of the optical scanner 1 can be prolonged. The planarization will be described later in detail.

An insulating layer 61 is provided on the upper surface (one surface) of the base 2, and an insulating layer 62 is provided on the lower surface (the other surface) of the base 2. A conductive pattern 8 formed of a coil 41, wiring lines 72 and 74, and electrodes 73 and 75 is provided on the surface of the insulating layer 62 that faces away from the base 2. The coil 41, the wiring lines 72 and 74, and the electrodes 73 and 75 will be described in detail in association with the description of the driver 4.

The insulating layers 61 and 62 are provided in portion other than the following portions in the plan view of the base 2 viewed in the thickness direction thereof: the edges of the connection portions 23 and 24, first connection edges 214 that connect the edge of the movable plate 21 to the edges of the connection portions 23 and 24, and second connection edges 222 that connect the edge of the support portion 22 to the edges of the connection portions 23 and 24. In other words, the insulating layers 61 and 62 are provided in portions other than the edges of the connection portions 23 and 24 and edges of the movable plate 21 and the support portion 22 in the vicinity of the connection portions 23 and 24.

The configuration described above allows the side surfaces of the movable plate 21, the support portion 22, and the connection portions 23 and 24 to be entirely planarized relatively readily with the insulating layers 61 and 62 formed on the base 2, as will be described later. Further, the edges and corners of the movable plate 21, the support portion 22, and the connection portions 23 and 24 can be rounded at the same time in the planarization process.

The planarization prevents or reduces stress concentration at the connection portions 23 and 24 from occurring when the movable plate 21 oscillates. As a result, the lifetime of the optical scanner 1 can be prolonged.

More specifically, neither the insulating layer 61 nor 62 is formed on the side surfaces of the movable plate 21, the connection portions 23 and 24, and the support portion 22. Each of the side surfaces of the movable plate 21, the connection portions 23 and 24, and the support portion 22 has substantially no insulating layer formed thereon but an exposed surface made of silicon.

Since the edges of the connection portions 23 and 24 and the edges of the movable plate 21 and the support portion 22 in the vicinity of the connection portions 23 and 24 have exposed surfaces made of silicon, the side surfaces of the movable plate 21, the support portion 22, and the connection portions 23 and 24 can be entirely planarized.

The phrase "substantially no insulating layer formed" used herein conceptually means that no insulating layer is formed at all or a silicon oxide film formed in natural oxidation or any other similar insulating film is formed. More specifically, the average thickness of such an insulating film, if any, is smaller than 10 nm. On the other hand, each of the insulating layers 61 and 62 is not an ultra-thin insulating layer formed in natural oxidation but has a thickness of 10 nm or greater.

The insulating layer 61 is so disposed that it covers the upper surface of the base 2 other than the upper surface of the movable plate 21 (that is, light reflecting portion 211), the edges of the upper surfaces of the connection portions 23 and 24, and the edge of the upper surface of the support portion 22 in the vicinity of the boundary between the support portion 22 and each of the connection portions 23, 24, as shown in FIG. 1. Each of the upper surface (that is, light reflecting portion 211) of the movable plate 21, the edges of the upper surfaces of the connection portions 23 and 24, and the edge of the upper surface of the support portion 22 in the vicinity of the boundary between the support portion 22 and each of the connection portions 23, 24 therefore has substantially no insulating layer formed thereon but an exposed surface made of silicon.

That is, the insulating layer 61 is so disposed that it covers substantially the entire area of the upper surface of the base 2 in the plan view of the base 2 except the upper surface of the movable plate 21, the edges of the connection portions 23 and 24, and the edges of the movable plate 21 and the support portion 22 in the vicinity of the connection portions 23 and 24. When the insulating layer 61 has a stray light prevention capability, as will be described later, the stray light prevention capability works well in this configuration.

On the other hand, the insulating layer 62 is so disposed that it covers the lower surface of the base 2 other than the edge of the lower surface of the movable plate 21, the edges of the lower surfaces of the connection portions 23 and 24, and the edge of the lower surface of the support portion 22 in the vicinity of the boundary between the support portion 22 and each of the connection portions 23, 24, as shown in FIG. 3. Each of the edge of the lower surface of the movable plate 21, the edges of the lower surfaces of the connection portions 23 and 24, and the edge of the lower surface of the support portion 22 in the vicinity of the boundary between the support portion 22 and each of the connection portions 23, 24 therefore has substantially no insulating layer formed thereon but has an exposed surface made of silicon.

That is, the insulating layer 62 is so disposed in the plan view of the base 2 that it covers substantially the entire area of the lower surface of the base 2 other than the edges of the connection portions 23 and 24 and the edges of the movable plate 21 and the support portion 22 in the vicinity of the connection portions 23 and 24. The components of the conductive pattern 8 can thus be reliably insulated from each other. Further, when the insulating layer 62 has a stray light prevention capability, as will be described later, the stray light prevention capability works well in this configuration.

Since neither the insulating layer 61 or 62 is formed on the side surfaces of the movable plate 21, the connection portions 23 and 24, the support portion 22, as well as the upper and lower portions in the vicinity of the side surfaces, the side surfaces can be entirely planarized and the corners can be rounded by performing planarization with the insulating layers 61 and 62 formed on the base 2.

Each of the insulating layers 61 and 62 is formed, for example, of a silicon oxide film or a silicon nitride film. A method for forming the insulating layers 61 and 62 will be described in detail later in association with the description of a method for manufacturing the base 2.

Each of the insulating layers 61 and 62 is insulative, which prevents the coil 41, the wiring lines 72 and 74, and the electrodes 73 and 75, which are provided on the insulating layer 62 and form the conductive pattern, from being short-circuited.

In particular, each of the insulating layers 61 and is preferably formed of a silicon oxide film. More specifically, each of the insulating layers 61 and 62 is preferably formed of a silicon thermal oxide film.

A silicon oxide film is insulative and can be relatively readily formed by thermally oxidizing silicon. When hydrogen annealing is performed as the planarization, minute irregularities can be formed on the surfaces of the insulating layers 61 and 62. The irregular insulating layers 61 and 62 prevent or suppress light reflection.

When each of the insulating layers 61 and 62 is formed of a silicon oxide film, the insulating layers 61 and 62 also prevent light having entered the optical scanner 1 from being reflected, as described above. That is, each of the insulating layers 61 and 62 forms an antireflection film that prevents light having entered the optical scanner from being reflected. When each of the insulating layers 61 and 62 is formed of a silicon oxide film, the insulating layers 61 and 62 also diffuse light. The light reflecting portion 211 on the movable plate 21 reflects light, whereas the insulating layers 61 and 62 having the antireflection and light diffusion capabilities prevent other light from being reflected off the other portions and forming stray light. That is, each of the insulating layers 61 and 62 forms anti-stray-light layer that prevents stray light from being produced.

The thickness of each of the insulating layers 61 and 62 is not limited to a specific value and is approximately, for example, greater than or equal to 10 nm but smaller than or equal to 1500 nm.

Support

The support 3 supports the base 2 described above. The support 3 also supports permanent magnets 42 and 43 that form the driver 4, which will be described later.

The support 3 has a box-like shape having a recess 31 open upward. In other words, the supports 3 is formed of a plate-shaped portion 32 having a plate-like shape and a frame-shaped portion 33 having a frame-like shape and provided along the outer periphery of the upper surface of the plate-shaped portion 32.

The lower surface of the support portion 22, which forms the base 2 described above, is bonded to the upper surface of the support 3, which is the portion outside the recess 31, that is, the upper surface of the frame-shaped portion 33. A space that allows the movable plate 21 to oscillate is thus formed between the movable plate 21/the pair of connection portions 23 and 24 of the base 2 and the support 3.

The material of which the support 3 is made is not limited to a specific one and may, for example, be quartz glass, PYREX glass ("PYREX" is a registered trade mark), TEMPAX glass, or any other glass material; single crystal silicon, polysilicon, or any other silicon material; LTCC (low-temperature cofire ceramic); or any other suitable material.

A method for bonding the base 2 to the support 3, which is determined as appropriate in accordance with the material, the shape, and other factors of the support 3, is not limited to a specific method and may be an adhesive-based method, anodic bonding, direct bonding, or any other suitable method.

Driver

The driver 4, which includes the coil 41 and the pair of permanent magnets 42 and 43, oscillates the movable plate 21, which forms the base 2 described above, by electromagnetically driving it (more specifically, based on a moving coil method). The electromagnetic driving can produce a large drive force. The driver 4 based on the electromagnetic driving can therefore produce a large oscillation angle of the movable plate 21 while using a reduced drive voltage.

The coil 41 is provided over the lower surface of the movable plate 21 via the insulating layer 62, as shown in FIG. 2. Since the coil 41 is provided on the insulating layer 62 provided on the surface of the movable plate 21 that faces away from the light reflecting portion 211, the conductive pattern 8 can be formed by making effective use of the surface of the base 2 that faces away from the light reflecting portion 211. Further, the light reflecting portion 211 can be designed with a full degree of freedom.

In the present embodiment, the coil 41 has a spiral shape over the surface of the movable plate 21, as shown in FIG. 3. The spiral coil 41 produces a larger magnetic force than a simple annular coil and is more simply configured and more readily manufactured than a coil formed by stacking wires in the thickness direction of the movable plate 21. That is, the coil 41 produces a large magnetic force while being configured relatively simply and driven with a reduced voltage.

An end of an elemental wire that forms the coil 41 (the end of the outermost line of the spiral) is electrically connected to the electrode 73 via the wiring line 72. The other end of the elemental wire that forms the coil 41 (the end close to the center of the spiral) is electrically connected to the electrode 75 via the wiring line 74. Applying voltage between the electrode 73 and the electrode 75 energizes the coil 41.

The wiring line 72 is disposed on the lower surface of the connection portion 23 along the longitudinal direction thereof, and the wiring line 74 is disposed on the lower surface of the connection portion 24 along the longitudinal direction thereof.

The electrodes 73 and 74 are disposed on the lower surface of the support portion 22.

The wiring line 74 extends to the vicinity of the center of the movable plate 21, and an insulating layer 63 formed, for example, of a silicon oxide film or a silicon nitride film is provided between the wiring line 74 and the coil 41.

The other end of the elemental wire that forms the coil 41 (the end close to the center of the spiral) may alternatively be connected to the wiring line 74 via a bonding wire.

The material of which the coil 41, the wiring lines 72 and 74, and the electrodes 73 and 75, which form the conductive pattern 8, are made is not limited to a specific one and may be any material that is conductive and resistant to heat generated in the planarization process in a method for manufacturing the base 2, which will be described later, for example, Pt, Ir, Os, Re, W, Ta, Ru, Tc, Mo, and Nb, preferably Ta among others.

Ta has a relatively excellent conductivity and extremely high melting point. These properties make Ta suitable for a conductor and resistant to heat generated in hydrogen annealing or any other heat treatment used in the planarization process.

On the other hand, the pair of permanent magnets 42 and 43 are bonded and fixed to the support 3.

The permanent magnet 42 is disposed on one side (left side in FIGS. 1 and 2) of the oscillation axis X of the movable plate 21, and the permanent magnet 43 is disposed on the other side (right side in FIGS. 1 and 2) of the oscillation axis X of the movable plate 21. The pair of permanent magnets 42 and 43 are disposed on opposite sides of the movable plate 21.

The permanent magnet 42 is so disposed that the north pole thereof faces the movable plate 21 and the south pole thereof faces away from the movable plate 21. On the other hand, the permanent magnet 43 is so disposed that the south pole thereof faces the movable plate 21 and the north pole thereof faces away from the movable plate 21. The pair of permanent magnets 42 and 43 produce a magnetic field in the vicinity of the movable plate 21, and the magnetic field is parallel to the surfaces of the movable plate 21 that is not in oscillating motion and perpendicular to the oscillation axis X of the movable plate 21.

Each of the permanent magnets 42 and 43 is not limited to a specific one and can, for example, preferably be a neodymium magnet, a ferrite magnet, a samarium-cobalt magnet, an alnico magnet, a bonded magnet, and any other magnet magnetized with a hard magnetic material.

The number, layout, polarity, and other properties of the permanent magnets are not limited to those shown in the drawings and may, of course, be any number, layout, and polarity that allow the movable plate 21 to oscillate based on the interaction with the magnetic field produced by the coil 41.

The thus configured optical scanner 1 operates as follows.

Periodically changing voltage (such as AC voltage, intermittent direct current) is applied between the electrode 73 and the electrode 75. The applied voltage alternately and periodically switches the magnetic field between a first magnetic field produced when the upper side of the coil 41 is the north pole and the lower side of the coil 41 is the south pole and a second magnetic field produced when the upper side of the coil 41 is the south pole and the lower side of the coil 41 is the north pole.

When the first magnetic field is produced, the upper side of the coil 41 is attracted to the permanent magnet 42, whereas the lower side of the coil 41 is attracted to the permanent magnet 43, whereby the movable plate 21 oscillates around the oscillation axis X clockwise in FIG. 2 (first state). Conversely, when the second magnetic field is produced, the upper side of the coil 41 is attracted to the permanent magnet 43, whereas the lower side of the coil 41 is attracted to the permanent magnet 42, whereby the movable plate 21 oscillates around the oscillation axis X counterclockwise in FIG. 2 (second state). The first and second states are alternately repeated, and the movable plate 21 oscillates around the oscillation axis X.

As described above, the movable plate 21, which is disposed in the magnetic fields produced by the pair of permanent magnets 42 and 43, pivots (oscillates) relative to the support portion 22 while torsionally deforming the connection portions 23 and 24.

According to the thus configured optical scanner 1, since the insulting layers 61 and 62 are provided on portions other than the edges of the connection portions 23 and 24, the edges of the movable plate 21 and the support portion 22 in the vicinity of the connection portions 23 and 24, the side surfaces of the movable plate 21, the support portion 22, and the connection portions 23 and 24 can be entirely planarized relatively readily with the insulting layers 61 and 62 formed on the base 2. Further, the edges and corners of the movable plate 21, the support portion 22, and the connection portions 23 and 24 can be rounded at the same time in the planarization process.

Stress concentration that occurs at the connection portions 23 and 24 when the movable plate 21 oscillates will therefore not occur or the amount of stress concentration can be reduced. As a result, the lifetime of the optical scanner 1 can be prolonged.

Method for Manufacturing Actuator

The optical scanner 1 described above can be manufactured, for example, as follows: As an example of a method for manufacturing an actuator according to an embodiment of the invention, a method for manufacturing the optical scanner 1 will be described with reference to FIGS. 5A to 5D and 6A to 6D. FIGS. 5A to 5D and 6A to 6D are cross-sectional views corresponding to FIG. 2.

The method for manufacturing the optical scanner 1 includes the step of forming the base 2.

The step of forming the base 2 includes [A] the step of forming the insulating layers 61 and 62, [B] the step of forming the conductive pattern 8, and [C] the step of forming the base 2.

Each of the steps will be sequentially described.

[A] Step of Forming Insulating Layers 61 and 62

A1

Figure 5A:
FIGS. 5A to 5D are cross-sectional views describing a method for manufacturing the optical scanner shown in FIG. 1.

A silicon substrate 102 is first provided, as shown in FIG. 5A.

The silicon substrate 102 will form the base 2 after undergoing etching and planarization, which will be described below.

A2

Figure 5B:
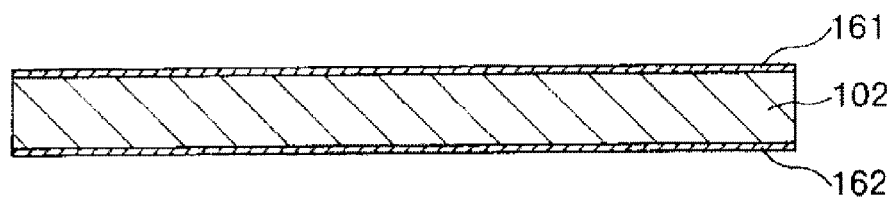

An insulating layer 161 is then uniformly formed on the upper surface of the silicon substrate 102, and an insulating layer 162 is uniformly formed on the lower surface of the silicon substrate 102, as shown in FIG. 5B.

Each of the insulating layers 161 and 162 is formed of a silicon oxide film or a silicon nitride film.

A method for forming the insulating layers 161 and 162 is not limited to a specific one. For example, when each of the insulating layers 161 and 162 is formed of a silicon oxide film, thermal oxidation can be used, whereas when each of the insulating layers 161 and 162 is formed of a silicon nitride film, vapor deposition, such as plasma CVD and LPCVD, can be used.

A3

Figure 5C:
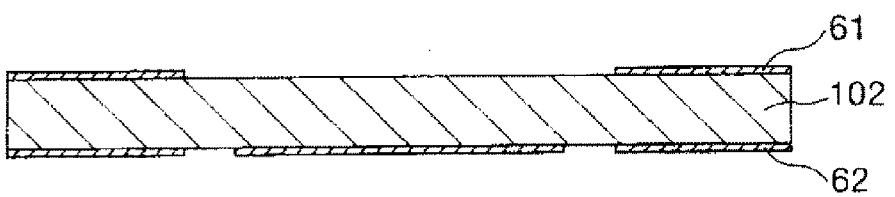

The insulating layers 61 and 62 are then formed by removing part of the insulating layers 161 and 162, as shown in FIG. 5C.

More specifically, a resist film (not shown) is first formed on each of the insulating layers 161 and 162. The resist film can be made of a positive or negative resist material.

Each of the resist films is then exposed to light and developed to form a mask having the shape corresponding to the plan shape of each of the insulating layers 61 and 62. The masks are used to etch away part of the insulating layers 161 and 162, and then the masks (resist films) are removed.

The etching described above is not limited to a specific one and may, for example, be reactive ion etching (RIE) or dry etching using $CF_4$.

A method for removing the masks (resist films) is not limited to a specific one and may, for example, be sulfuric-acid washing or $O_2$ ashing.

[B] Step of forming conductive pattern 8

B1

Figure 5D:
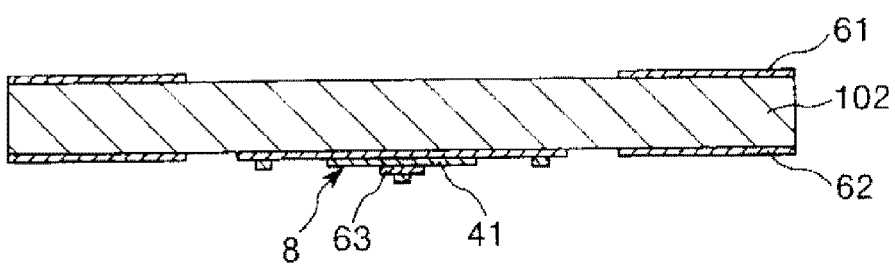

The conductive pattern 8 including the coil 41 is then formed on the insulating layer 62, as shown in FIG. 5D. The insulating layer 63 is also formed.

More specifically, for example, the coil 41 and the wiring line 72, and the electrode 73 are formed together. After the insulating layer 63 is formed, the wiring line 74 and the electrode 75 are formed together.

A method for forming the conductive pattern 8 (coil 41, wiring lines 72 and 74, and electrodes 73 and 75) is not limited to a specific one and may, for example, be vacuum evaporation, sputtering (low-temperature sputtering), ion plating or any other dry plating, electrolysis plating, electroless plating, or any other wet plating, flame spraying, or metal foil bonding.

A method for forming the insulating layer 63 is not limited to a specific one and may, for example, be plasma CVD or any other vapor deposition.

[C] Step of Forming Base 2

C1

Figure 6A:
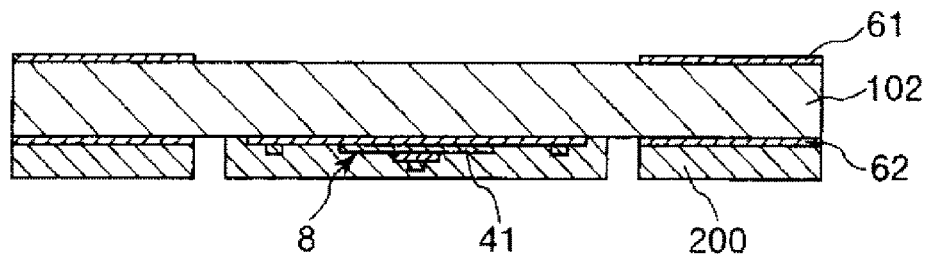
FIGS. 6A to 6D are cross-sectional views describing the method for manufacturing the optical scanner shown in FIG. 1.

A mask 200 having the shape corresponding to the plan shape of the base 2 is then formed on the insulating layer 62, as shown in FIG. 6A.

More specifically, a resist film (not shown) is formed on the insulating layer 62. The resist film can be made of a positive or negative resist material.

The resist film is then exposed to light and developed to form a mask 200 having the shape corresponding to the plan shape of the base 2.

The mask 200 may be formed on the insulating layer 61 or on each of the insulating layers 61 and 62.

C2

Figure 6B:
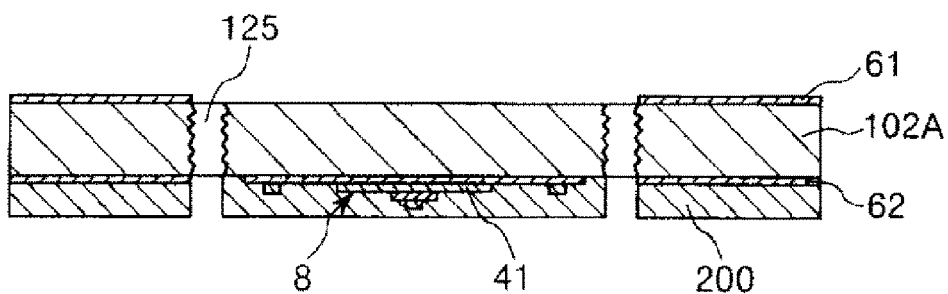

The silicon substrate 102 with the mask 200 formed thereon then undergoes dry etching to form a base 102A having the shape corresponding to the base 2, as shown in FIG. 6B.

A through hole 125 passing through the base 102A in the thickness direction thereof is thus formed in the dry etching process. Minute irregularities are formed in the dry etching process on the wall surface of the through hole 125. The through hole 125 undergoes planarization, which will be described later, to form the through hole 25.

The dry etching used to form the through hole 125 is not limited to a specific one and may, for example, be plasma etching, reactive ion etching, beam etching, or light-assisted etching.

The method for forming the through hole 125 may alternatively be wet etching using, for example, KOH aqueous solution. In this case, the mask 200 may be formed also on the upper surface of the base 102.

C3

Figure 6C:
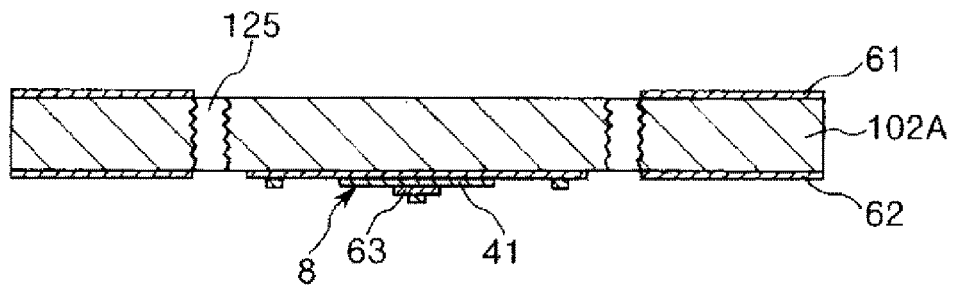

The mask 200 is then removed. The insulating layers 61 and 62 are thus exposed, as shown in FIG. 6C.

A method for removing the mask 200 (resist film) is not limited to a specific one and may, for example, be sulfuric-acid washing or $O_2$ ashing.

C4

Figure 6D:
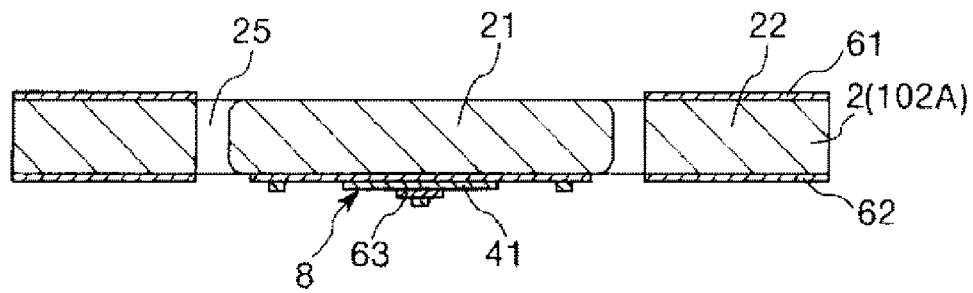

The base 102A then undergoes planarization, by which the base 2 is provided, as shown in FIG. 6D.

At this point, the wall surface of the through hole 125 and the portions of the upper and lower surfaces of the base 102A that are in the vicinity of the open ends of the through hole 125 and are not covered with the insulating layer 61 or 62 are exposed.

The wall surface of the through hole 125 is therefore planarized, and corners present on the wall surface of the through hole 125, that is, a portion in the vicinity of the boundary between the side surface of the movable plate 21 and the side surface of each of the connection portions 23 and 24 and a portion in the vicinity of the boundary between the side surface of the support portion 22 and the side surface of each of the connection portions 23 and 24, are rounded.

Further, the upper and lower surfaces of the base 102A that are in the vicinity of the open ends of the through hole 125 and are not covered with the insulating layer 61 or 62 are also rounded.

The planarization method is not limited to a specific one and can, for example, preferably be a heat treatment (more specifically, hydrogen annealing performed in an $H_2$-introduced Ar atmosphere at a temperature ranging from about 900 to 1300° C. under a reduced pressure by a few torrs or a higher pressure up to the atmospheric pressure or hydrogen annealing continuously followed by annealing performed at a temperature ranging from about 900 to 1300° C. under about the atmospheric pressure or a lower pressure after the atmosphere gas is switched to an Ar atmosphere). In this way, the side surfaces of the movable plate 21, the support portion 22, and the connection portions 23 and 24 can be planarized, and the edges and corners of the movable plate 21, the support portion 22, and the connection portions 23 and 24 can be rounded.

Figure 7:
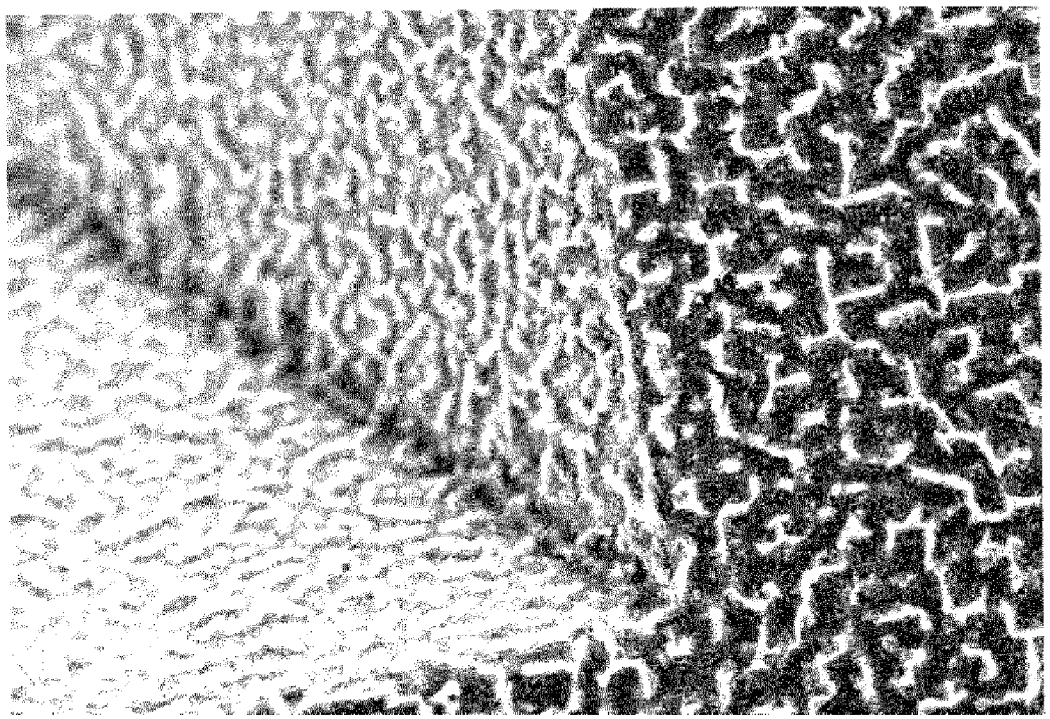
FIG. 7 shows a surface state after hydrogen annealing performed on a silicon structure covered with an insulating layer formed of a silicon oxide film.

When each of the insulating layers 61 and 62 is formed of a silicon oxide film and hydrogen annealing is performed as the planarization, minute irregularities are formed, as shown in FIG. 7.

Although not shown, the support 3 is then bonded to the base 2, and the pair of permanent magnets 42 and 43 are placed.

The optical scanner 1 is thus produced by carrying out the steps described above.

According to the method for manufacturing the optical scanner 1 described above, in the step of forming the insulating layers 61 and 62, the insulating layers 61 and 62 are formed on portions other than the edges of the connection portions 23 and 24 and the edges of the movable plate 21 and the support portion 22 in the vicinity of the connection portions 23 and 24 in the plan view of the base 2 to be formed. As a result, the side surfaces of the movable plate 21, the support portion 22, and the connection portions 23 and 24 can be entirely planarized relatively readily with the insulating layers 61 and 62 formed on the base 102A. Further, the edges and corners of the movable plate 21, the support portion 22, and the connection portions 23 and 24 can be rounded at the same time in the planarization process.

In the thus provided optical scanner 1, stress concentration will not occur at the connection portions 23 and 24 when the movable plate 21 oscillates, or the amount of stress concentration can be reduced. As a result, the lifetime of the optical scanner 1 can be prolonged.

Second Embodiment

A second embodiment of the invention will next be described.

Figure 8:
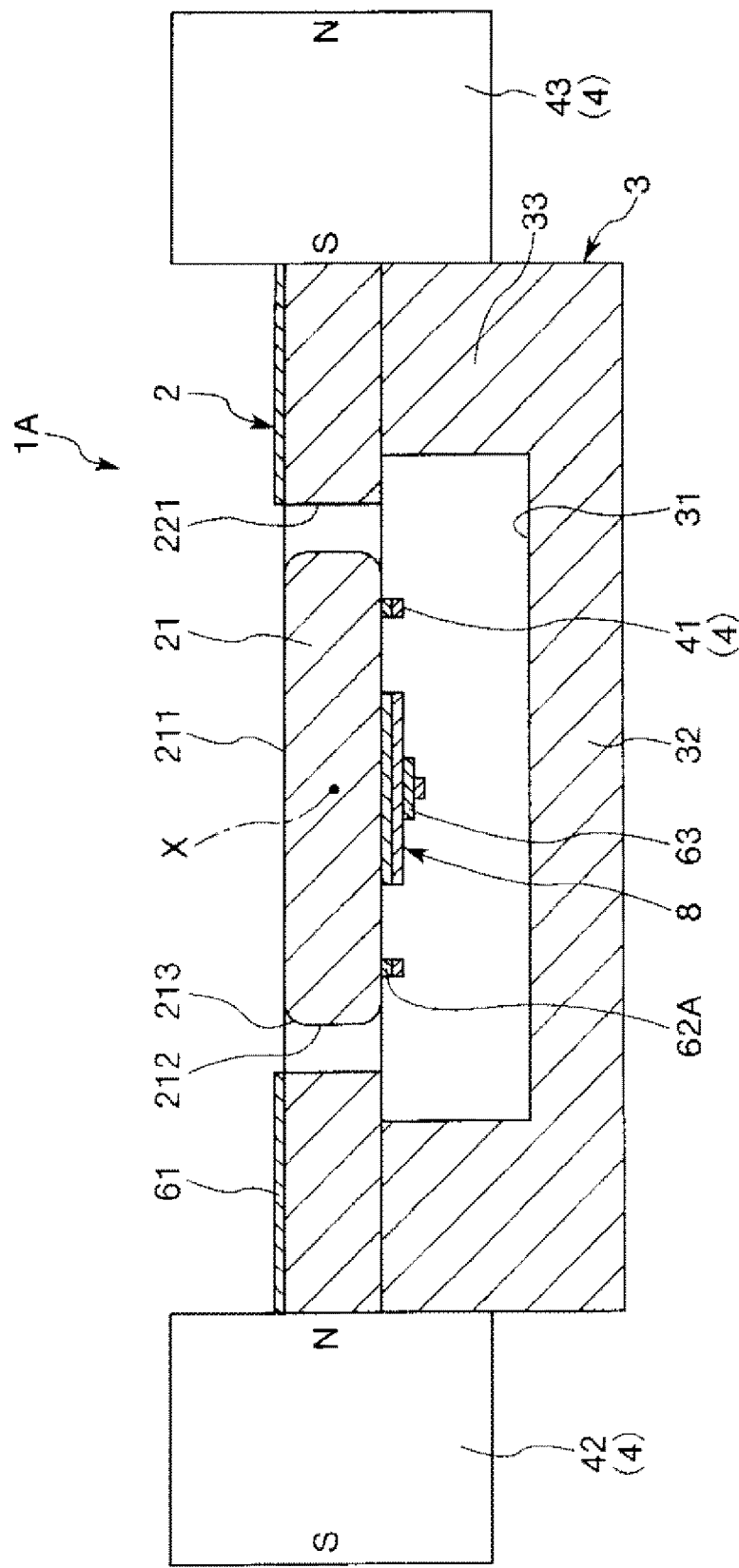
FIG. 8 is a cross-sectional view showing an optical scanner according to a second embodiment of the invention.
Figure 9:
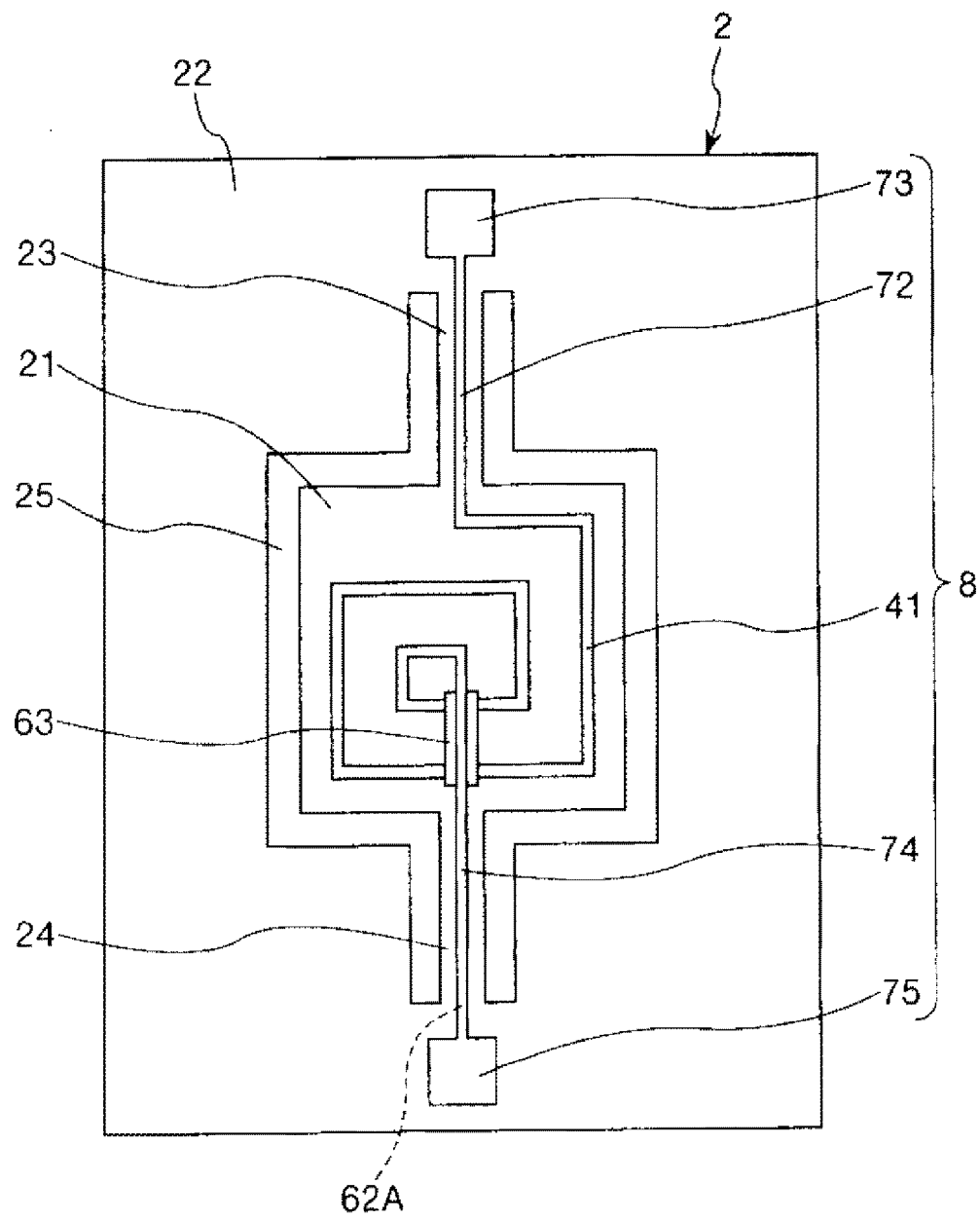
FIG. 9 is a plan view (bottom view) of a base (structure including movable plate, support portion, and a pair of elastic portions) provided in the optical scanner shown in FIG. 8.

FIG. 8 is a cross-sectional view showing an optical scanner according to the second embodiment of the invention, and FIG. 9 is a plan view (bottom view) of a base (structure including movable plate, support portion, and a pair of elastic portions) provided in the optical scanner shown in FIG. 8.

The optical scanner according to the second embodiment will be described below, primarily about what differs from the optical scanner according to the embodiment described above, and descriptions of similar items will be omitted.

The optical scanner according to the second embodiment is substantially similar to the optical scanner 1 according to the first embodiment but differs therefrom in terms of the shape of the insulating layer provided on the lower surface of the base 2. The same components as those in the embodiment described above have the same reference characters.

An optical scanner 1A according to the present embodiment includes an insulating layer 62A provided on the lower surface of the base 2, as shown in FIGS. 8 and 9. The coil 41, the wiring lines 72 and 74, and the electrodes 73 and 75 are provided over the base 2 with the insulating layer 62A therebetween.

The insulating layer 62A has the same shape as that of the conductive pattern 8 formed of the coil 41, the wiring lines 72 and 74, and the electrodes 73 and 75. That is, the insulating layer 62A is formed only immediately under the conductive pattern 8.

The planarization can be performed in the same manner as in the first embodiment described above with the thus shaped insulating layer 62A formed on the lower surface of the base 2.

When the insulating layer 62A has the same shape as that of the conductive pattern 8, the insulating layer 62A can be patterned in an etching process using the conductive pattern 8 as a mask.

In the optical scanner 1A according to the second embodiment described above, in which the insulating layers 61 and 62A are provided on portions other than the edges of the connection portions 23 and 24 and the edges of the movable plate 21 and the support portion 22 in the vicinity of the connection portions 23 and 24, the side surfaces of the movable plate 21, the support portion 22, and the connection portions 23 and 24 can also be entirely planarized relatively readily with the insulating layers 61 and 62A formed on the base 2. Further, the edges and corners of the movable plate 21, the support portion 22, and the connection portions 23 and 24 can be rounded at the same time in the planarization process.

Stress concentration will thus not occur at the connection portions 23 and 24 when the movable plate 21 oscillates, or the amount of stress concentration can be reduced. As a result, the lifetime of the optical scanner 1A can be prolonged.

The optical scanners described above can suitably be used with a projector, a laser printer, an imaging display, a barcode reader, a scanning confocal microscope, and other image formation apparatus. Such an image formation apparatus therefore has excellent image drawing characteristics.

Since such an image formation apparatus includes the optical scanner 1 or 1A described above, the lifetime of the image formation apparatus can be prolonged.

Image Formation Apparatus

An image formation apparatus according to an embodiment of the invention will be described.

Projector

Figure 10:
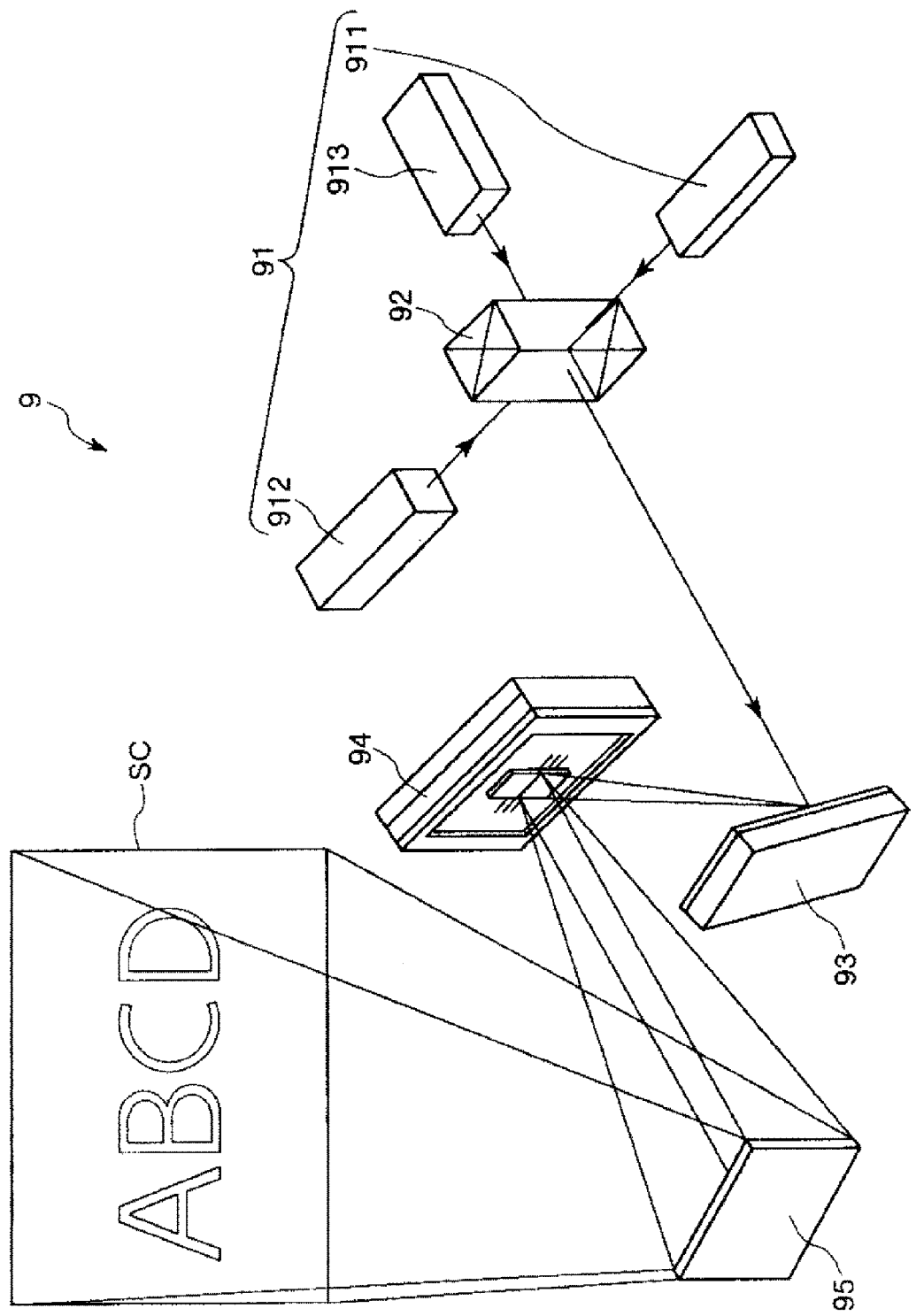
FIG. 10 is a schematic view showing an image formation apparatus (projector) according to an embodiment of the invention.

FIG. 10 is a schematic view showing the image formation apparatus (projector) according to the embodiment of the invention. In the following description, the longitudinal direction of a screen SC is called a "horizontal direction," and the direction perpendicular to the longitudinal direction is called a "vertical direction," for ease of description.

A projector 9 shown in FIG. 10 includes a light source 91 that emits light, such as laser light, a cross-dichroic prism 92, a pair of optical scanners 93 and 94 according to any of the embodiments of the invention (optical scanner configured in the same manner as the optical scanner 1, for example), and a fixed mirror 95.

The light source 91 includes a red light source 911 that emits red light, a blue light source 912 that emits blue light, and a green light source 913 that emits green light.

The cross-dichroic prism 92 is an optical element formed by bonding four right-angle prisms and combines light fluxes emitted from the red light source 911, the blue light source 912, and the green light source 913.

In the thus configured projector 9, the cross-dichroic prism 92 combines the light fluxes emitted from the red light source 911, the blue light source 912, and the green light source 913 based on image information from a host computer (not shown), and the combined light is deflected by the optical scanners 93 and 94, reflected off the fixed mirror 95, and forms a color image on the screen SC.

How the optical scanners 93 and 94 deflect light will be specifically described.

The light combined in the cross-dichroic prism 92 is first deflected by the optical scanner 93 in the horizontal direction (primary scan). The light deflected in the horizontal direction is then further deflected by the optical scanner 94 in the vertical direction (secondary scan). A two-dimensional color image can thus be formed on the screen SC. Using the optical scanner according to any of the embodiments of the invention as each of the optical scanners 93 and 94 provides an extremely excellent image drawing characteristic.

It is noted that the projector 9 is not necessarily configured as described above but can be configured differently as long as the optical scanners deflect light to form an image on an intended surface. For example, the fixed mirror 95 can be omitted.

According to the thus configured projector 9, which includes the optical scanners 93 and 94, each of which has the same configuration as that of the optical scanner 1 described above, a high-quality image can be produced at low cost.

Head-Up Display

Figure 11:
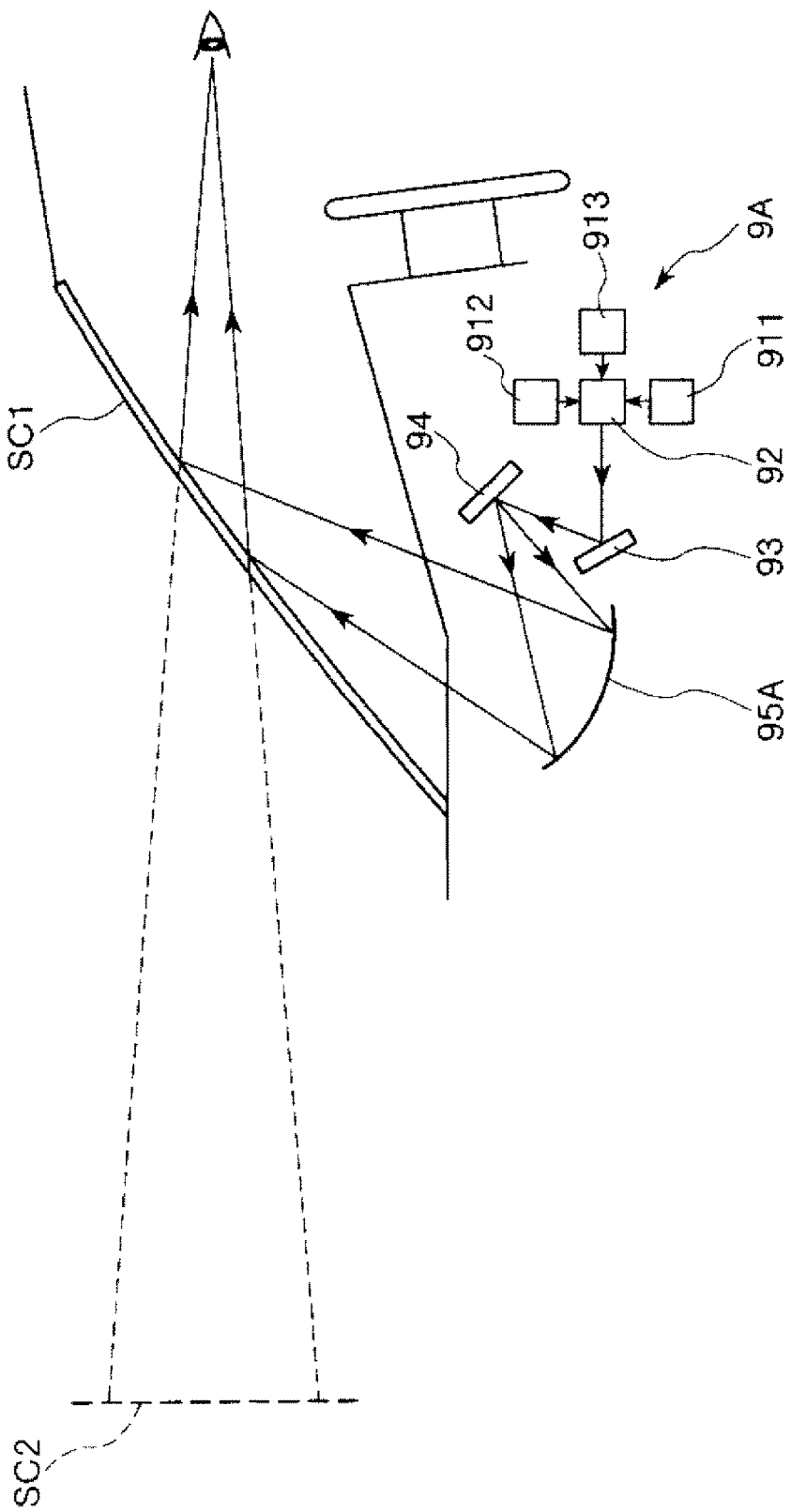
FIG. 11 is a schematic view showing an image formation apparatus (head-up display) according to another embodiment of the invention.

FIG. 11 is a schematic view showing an image formation apparatus (head-up display) according to another embodiment of the invention. In the following description, the same components as those in the projector 9 described above will not be described.

A head-up display 9A shown in FIG. 11 is an apparatus that projects a variety of pieces of information on a front window SC1 in a mobile vehicle, such as an automobile and an airplane.

The head-up display 9A includes the red light source 911, the blue light source 912, the green light source 913, the cross-dichroic prism 92, the pair of optical scanners 93 and 94, and a fixed mirror 95A.

The fixed mirror 95A is a concave mirror and projects the light from the optical scanner 94 onto the front window SC1. An operator of the mobile vehicle can view a displayed image that is a virtual image in an imaginary plane SC2 positioned in front of the front window SC1.

An actuator, a method for manufacturing the actuator, an optical scanner, and an image formation apparatus according to embodiments of the invention have been described with reference to the drawings, but the invention is not limited to the embodiments. For example, the configuration of each of the actuator, the optical scanner, and the image formation apparatus according to the embodiments of the invention can be replaced with an arbitrary configuration that performs the same function as that provided in the embodiments described above and an arbitrary configuration can be added thereto. In the method for manufacturing the actuator according to the embodiment of the invention, an arbitrary step can be added.

The above embodiments have been described with reference to the case where the movable plate has a symmetrical shape with respect to at least one of the oscillation axis and a line perpendicular thereto in a plan view, but the movable plate is not necessarily shaped this way. The movable plate may have an asymmetrical shape with respect to the oscillation axis and a line perpendicular thereto in a plan view.

Further, the above embodiments have been described with reference to the case where a pair of connection portions that pivotally connect the movable plate to the support portion are provided. The number of connection portions may alternatively be one or three or more as long as the connection portions pivotally connect the movable plate to the support portion.

The above embodiments have been described with reference to the case where the actuator according to any of the embodiments of the invention is used as an optical scanner, but the actuator according to any of the embodiments of the invention is not necessarily used as an optical scanner. For example, the actuator according to any of the embodiments of the invention can be used as an optical switch, an optical attenuator, or any other optical device.

The above embodiments have been described with reference to the case where the driver that oscillates the movable plate is a moving coil driver that electromagnetically drives the movable plate. The driver may alternatively be a moving magnet driver that also electromagnetically drives the movable plate, an electrostatic driver, a piezoelectric driver, or any other driver based on a non-electromagnetic driving method.

The above embodiments have been described with reference to the case where the conductive pattern provided over the base via an insulating layer includes a coil. The conductive pattern is not necessarily configured this way but may be arbitrarily configured as long as electric conduction is achieved. For example, the conductive pattern may include wiring lines for conducting current to a variety of drive sources or wiring lines connected to a variety of sensors.

The entire disclosure of Japanese Patent Application No. 2011-058556, filed Mar. 16, 2011 is expressly incorporated by reference herein.

What is claimed is:

1. An actuator comprising:
   a base made of silicon and including a movable portion capable of oscillating around an oscillation axis, at least one connection portion extending from the movable portion, and a support portion that supports the connection portion;
   an insulating layer provided on a surface of the base; and
   a conductive portion having conductivity and provided on the insulating layer,
   wherein in a plan view of the base viewed in a thickness direction of the base, the insulating layer is provided on portions other than an edge of the connection portion, an edge that connects an edge of the movable portion to one end of the connection portion, and an edge that connects an edge of the support portion to another end of the connection portion, the one end is disposed closer to the movable portion than the another end the another end is disposed closer to the support portion than the one end.

2. The actuator according to claim 1,
   wherein each of the edge of the connection portion, the edge that connects the edge of the movable portion to the edge of the connection portion, and the edge that connects the edge of the support portion to the edge of the connection portion has an exposed surface made of the silicon.

3. The actuator according to claim 2,
   wherein each of the edge of the connection portion, the edge that connects the edge of the movable portion to the edge of the connection portion, and the edge that connects the edge of the support portion to the edge of the connection portion is planarized.

4. The actuator according to claim 1,
   wherein the movable portion has a light reflecting portion provided on the movable portion and having light reflectivity.

5. The actuator according to claim 4,
   wherein the insulating layer is provided on a surface of the base that faces away from the surface on which the light reflecting portion is provided.

6. The actuator according to claim 5,
   wherein in the plan view of the base viewed in the thickness direction of the base, the insulating layer is provided on the entire surface of the base other than the edge of the connection portion, the edge that connects the edge of the movable portion to the edge of the connection portion, and the edge that connects the edge of the support portion to the edge of the connection portion.

7. The actuator according to claim 1,
   wherein the insulating layer has the same shape as the shape of the conductive portion.

8. The actuator according to claim 1,
   wherein the insulating layer prevents light reflection.

9. The actuator according to claim 8,
   wherein the insulating layer is formed of a silicon oxide film or a silicon nitride film.

10. The actuator according to claim 1,
    wherein the conductive portion is made of Ta.

11. A method for manufacturing an actuator, the method comprising:
    forming an insulating layer on a surface of a silicon substrate;
    forming a conductive portion on the insulating layer; and
    forming a base including a movable portion capable of oscillating around an oscillation axis, at least one connection portion extending from the movable portion, and a support portion that supports the connection portion by etching and then planarizing the silicon substrate,
    wherein in the formation of the insulating layer, in a plan view of the base viewed in a thickness direction of the base, the insulating layer is formed on portions other than an edge of the connection portion, an edge that connects an edge of the movable portion to one end of the connection portion, and an edge that connects an edge of the support portion to another end of the connection portion, the one end is disposed closer to the movable portion than the another end, and the another end is disposed closer to the support portion than the one end.

12. The method for manufacturing an actuator according to claim 11,
wherein the planarization is hydrogen annealing.

13. The method for manufacturing an actuator according to claim 12,
wherein the planarization is the hydrogen annealing followed by annealing in an Ar atmosphere.

14. An optical scanner comprising:
a base made of silicon and including a movable portion capable of oscillating around an oscillation axis and including a light reflecting portion having light reflectivity, at least one connection portion extending from the movable portion, and a support portion that supports the connection portion;
an insulating layer provided on a surface of the base; and
a conductive portion having conductivity and provided on the insulating layer,
wherein in a plan view of the base viewed in a thickness direction of the base, the insulating layer is provided on portions other than an edge of the connection portion, an edge that connects an edge of the movable portion to one end of the connection portion, and an edge that connects an edge of the support portion to another end of the connection portion, the one end is disposed closer to the movable portion than the another end, the another end is disposed closer to the support portion than the one end.

* * * * *